United States Patent
Polder et al.

(10) Patent No.: US 9,969,656 B2
(45) Date of Patent: May 15, 2018

(54) METHOD OF REPAIRING STEEL REINFORCED CONCRETE STRUCTURE AFFECTED BY CHLORIDE INDUCED CORROSION

(71) Applicants: Nederlandse Organisatie voor toegepast-natuurwetenschappelijk onderzoek TNO, The Hague (NL); Norwegian University of Science and Technology, Trondheim (NO)

(72) Inventors: Robert Benjamin Polder, The Hague (NL); Mette Rica Geiker, Trondheim (NO)

(73) Assignee: NEDERLANDSE ORGANISATIE VOOR TOEGEPAST-NATUURWETENSCHAPPELIJK ONDERZOEK TNO, The Hague (NL)

(*) Notice: Subject to any disclaimer, the term of this patent is extended or adjusted under 35 U.S.C. 154(b) by 99 days.

(21) Appl. No.: 14/906,609

(22) PCT Filed: Jul. 21, 2014

(86) PCT No.: PCT/NL2014/050496
§ 371 (c)(1),
(2) Date: Jan. 21, 2016

(87) PCT Pub. No.: WO2015/012684
PCT Pub. Date: Jan. 29, 2015

(65) Prior Publication Data
US 2016/0159700 A1 Jun. 9, 2016

(30) Foreign Application Priority Data

Jul. 22, 2013 (EP) ................................. 13177436

(51) Int. Cl.
*C04B 41/53* (2006.01)
*C04B 41/00* (2006.01)
*C04B 41/72* (2006.01)

(52) U.S. Cl.
CPC ........ *C04B 41/5376* (2013.01); *C04B 41/009* (2013.01); *C04B 41/72* (2013.01)

(58) Field of Classification Search
CPC ............................ C04B 41/5376; C04B 41/41
See application file for complete search history.

(56) References Cited

U.S. PATENT DOCUMENTS

| | | | | |
|---|---|---|---|---|
| 4,832,803 A | * | 5/1989 | Vennesland | C04B 41/5376 204/294 |
| 5,538,619 A | * | 7/1996 | Miller | C04B 41/72 205/687 |
| 6,322,691 B1 | | 11/2001 | Miller | |

OTHER PUBLICATIONS

Tilly et al., "Concrete repairs—performance in service and current practice," IHS BRE Press, Bracknell.

* cited by examiner

*Primary Examiner* — Arun S Phasge
(74) *Attorney, Agent, or Firm* — Hoffman & Baron, LLP

(57) ABSTRACT

A method of repairing a steel reinforced concrete structure (100) affected by chloride induced corrosion, comprising:
subjecting the reinforced concrete structure (100) to an electrochemical treatment so as to enrich material (102, 120, 140) embedding the steel reinforcement (110) with chlorides originating from corrosion pits (112) in the steel reinforcement; and
replacing the material (102, 120, 140) embedding the steel reinforcement (110), which has been enriched with chlorides during the electrochemical treatment, with a repair material (124) that is relatively poor in chlorides.

14 Claims, 4 Drawing Sheets

METHOD OF REPAIRING STEEL REINFORCED CONCRETE STRUCTURE AFFECTED BY CHLORIDE INDUCED CORROSION

This application is the U.S. National Phase of, and Applicants claim priority from, International Patent Application Number PCT/NL2014/050496 filed Jul. 21, 2014, which claims priority from EP 13177436.6 filed Jul. 22, 2013, each of which is incorporated herein by reference.

FIELD OF THE INVENTION

The present invention relates to a method of repairing a steel reinforced concrete structure, e.g. a bridge deck, whose steel reinforcement is affected by chloride induced corrosion.

BACKGROUND

It is well known that the rebars (short for reinforcing bars) in a steel reinforced concrete structure may suffer from corrosion. In particular in environments where sea water or deicing salts are present, chlorides may penetrate into the structure during a period of several decades unnoticed, until the chloride content at the rebar surface inside the structure reaches a critical level and initiates corrosion.

At the surface of the rebars embedded in the concrete, corrosion may result in the formation of voluminous corrosion products (rust) which have two to four times the volume of the original steel and no desirable mechanical properties. The corrosion products may cause the formation of cracks in the embedding concrete, which may eventually spall off at the surface. Corrosion may also produce (corrosion) pits or holes in the surface of the reinforcing steel, thereby reducing the strength of the structure due to a reduced cross-sectional area of the rebars.

Conventional methods of repairing a corrosion affected structure aim to replace chloride contaminated concrete in the structure with chloride-free concrete. This is typically done by removing cracked and spalled concrete and breaking out additional concrete until the depth of chloride penetration, thereby exposing the rebars; cleaning the surface of the rebars, for instance by grit blasting, and, eventually, applying new and chloride-free concrete. Research has shown, however, that about half of such conventional repairs fail within ten years, which is considered too short with regard to the usually required duration of 20-50 years and the cost of the repairs. See for more information Tilly, G. P., Jacobs, J., 1007, *Concrete repairs—performance in service and current practice*, IHS BRE Press, Bracknell, ISBN: 978-1-86081-974-2. Conventional repair failure has been found to be often attributable to one or more of the following causes: (i) insufficient concrete removal, leaving some chloride contaminated concrete in place; (ii) insufficient cleaning of the affected reinforcing steel, leaving corrosion products and chloride ions in the corrosion pits; and (iii) electrochemical effects between repaired and surrounding non-repaired locations where chlorides are present.

As alternatives to conventional methods of repair, various electrochemical methods have been proposed in the art. One such method is chloride extraction, in which chlorides are caused to migrate into an external electrolyte under the influence of an electric field. The chlorides accumulate in the electrolyte, and are eventually discarded together with the electrolyte, such that the concrete structure is left in a state without chlorides in which the rebars may repassivate. A notorious drawback of chloride extraction is the unpredictability of its duration. A treatment may last anywhere between several weeks and several months, and during this period samples of the concrete must be taken and analyzed to determine residual chloride levels to monitor how the treatment advances.

U.S. Pat. No. 6,322,691-B1 (Miller) has suggested another exclusively electrochemical curative treatment for chloride-induced corrosion affected steel reinforced structures. The treatment entails establishing a distributed direct current between the reinforcing steel, connected as a cathode, and an external, distributed electrode, connected as an anode. The current may have a density of at least 0.1 Ampere per square meter of surface area of the reinforcing steel, and be passed for a time sufficient to provide a total charge of at least about 100, but not substantially more than 2,000, Ampere-hours per square meters of surface area of the reinforcing steel. The distributed direct current is contended to cathodically strip the rebars, in the sense that any existing oxide or other films on their surface are removed. At the same time, the rebars are negatively charged, which causes chloride ions to be strongly repelled from the steel surface and driven back into the surrounding concrete. This would render the surrounding concrete essentially chloride free to a distance of usually at least 10 mm from the steel. Accordingly, once the electrochemical treatment is ceased, the rebars, which are now in a clean, active and chloride-free environment, are alleged to be given the opportunity to slowly repassivate by forming a dense protective oxide film (also known as a 'passivating film') to protect the steel from corrosion. The corrosion protection imparted this way is suggested to be long lived, and robust against new penetration by chloride ions.

SUMMARY OF THE INVENTION

The above described methods have their disadvantages. As mentioned, conventional repairs have been found to fail prematurely. To prevent such early failures, conventional repairs might be supplemented, i.e. followed, by a permanent protective (instead of curative) treatment, like for instance 'cathodic protection'; such permanent treatments, however, are inherently expensive. Chloride extraction, in turn, is a prolonged process, whose advancement is rather unpredictable and therefore difficult to plan. Furthermore, the 'repassivation theory' put forward in U.S. Pat. No. '691 appears rather doubtful in the circumstances, in particular because the applied direct current does not serve to remove any chlorides from the steel reinforced structure (as in electrochemical chloride extraction methods), but merely to distribute them away from the rebars. Even if this redistribution of chlorides would be generally successful, and passivation of the rebar surface would occur to some extent, the high chloride levels left in the structure are bound to retrigger and subsequently sustain new corrosion of the rebars. Accordingly, the curative method proposed by U.S. Pat. No. '691 is unlikely to be any more durable than conventional methods.

It is therefore an object of the present invention to provide for an economic, relatively short and predictable method of repairing a steel reinforced concrete structure affected by chloride induced corrosion, whose result is more durable than that of known methods.

To this end, a first aspect of the present invention is directed to a method of repairing a steel reinforced concrete structure affected by chloride induced corrosion. The method comprises subjecting the reinforced concrete structure to an electrochemical treatment so as to enrich material embedding the steel reinforcement with chlorides originating from corrosion pits in the steel reinforcement. The method also comprises replacing the material embedding the steel reinforcement, which has been enriched with chlorides during the electrochemical treatment, with a repair material that is relatively poor in chlorides.

The presently proposed method combines both conventional and electrochemical curative action in a single, relatively quick treatment with a highly predictive treatment time. The underlying idea is to electrochemically extract chlorides from both corrosion pits in the steel reinforcement (which are relatively rich in chlorides and may therefore be regarded as chloride hot spots) and, in passing, corrosion products present on the steel reinforcement's surface, and to transport the extracted chlorides into a sacrificial material embedding the steel reinforcement so as to enrich this material in chlorides. Once the surface of the steel reinforcement has been electrochemically cleaned, and in particular when the corrosion pits have been depleted in chlorides, the enriched embedding material may be removed from the structure in order to substantially clear the overall structure of chloride contamination. After that, repair material that is relatively poor in chlorides may be applied to the structure as a substitute for the removed enriched material.

The material embedding the steel reinforcement may typically be concrete, i.e. original concrete of the steel reinforced structure. However, in case the original concrete has been damaged, e.g. cracked or spalled, for instance as a result of corrosion of the embedded steel reinforcement, to such an extent that it is unsuitable to facilitate the electrochemical treatment of the structure, the original concrete may either be (i) temporarily repaired with an electric resistivity-matched repair mortar, or (ii) replaced altogether with an electrolyte paste that will serve as the material embedding the steel reinforcement during the electrochemical treatment. Both actions under (i) and (ii) may be performed before commencement of the electrochemical treatment, and whether option (i) or (ii) is preferred may depend on the level of damage to the concrete. Lightly damaged sections may preferably be repaired, while heavily damaged sections may preferably be replaced. In either case, the embedding material may be replaced with permanent repair material after the electrochemical treatment.

The repair material, which may typically be concrete, may preferably be relatively poor in chlorides. Here 'relative poor in' means that the repair material contains less chlorides than the material embedding the steel reinforcement that it replaces. In a preferred embodiment, the repair material may be substantially chloride free.

The electrochemical treatment not only serves to extract chlorides from the surface in the steel reinforcement, and in particular from the corrosion pits therein, but also acts to increase the pH inside the corrosion pits from typically acidic values (i.e. pH values of 5 and below) that promote corrosion, to highly alkaline values (i.e. pH values of 12 and above) that protect the steel reinforcement and promote repassivation. Practically, the treatment may comprise applying a distributed electrode to an exposed surface of the material embedding the steel reinforcement, and applying a DC voltage across the distributed electrode, as a positive terminal, and the steel reinforcement, as a negative terminal, thereby effecting a distributed current between the distributed electrode (anode) and the steel reinforcement (cathode). The DC voltage may be in the range of 5-40 V, while a current intensity of the distributed current may be in the range of 1-10 $A/m^2$ of steel reinforcement surface. The distributed current may be flown during a period in the range of 8-48 hours, or at least sufficiently long to ensure that a total charge that is exchanged between the terminals during the electrochemical treatment is in the range of 8-480 $Ah/m^2$ of steel reinforcement surface, and preferably 24-240 $Ah/m^2$ of steel reinforcement surface.

With regard to the terminology used in this text, the following may be noted. The term 'chloride' may be construed to refer to negatively charged chloride ions ($Cl^-$), and to compounds comprising chlorine atoms in such an oxidation state.

These and other features and advantages of the invention will be more fully understood from the following detailed description of certain embodiments of the invention, taken together with the accompanying drawings, which are meant to illustrate and not to limit the invention.

DETAILED DESCRIPTION

This detailed description describes two scenarios that represent respective realistic, industrial scale cases in which the presently disclosed method may be applied as the preferred method of repairing a chloride induced corrosion affected steel reinforced concrete structure. The two cases represent two extremes in terms of the amount of concrete damage that is present when the repair is prepared; many real life cases will be somewhere in between. The cases will be described in terms of the starting situation, the information available, and the steps taken to carry out the presently disclosed method of repair. As part of the description, various known curative and protective options are briefly discussed, including arguments for/against each of them.

Case I—Bridge Abutment

The first case features a steel reinforced structure whose rebars display wide spread corrosion initiation and pitting, but damage to the concrete of the structure itself is so far limited.

1.1—Background

Figure 1A:
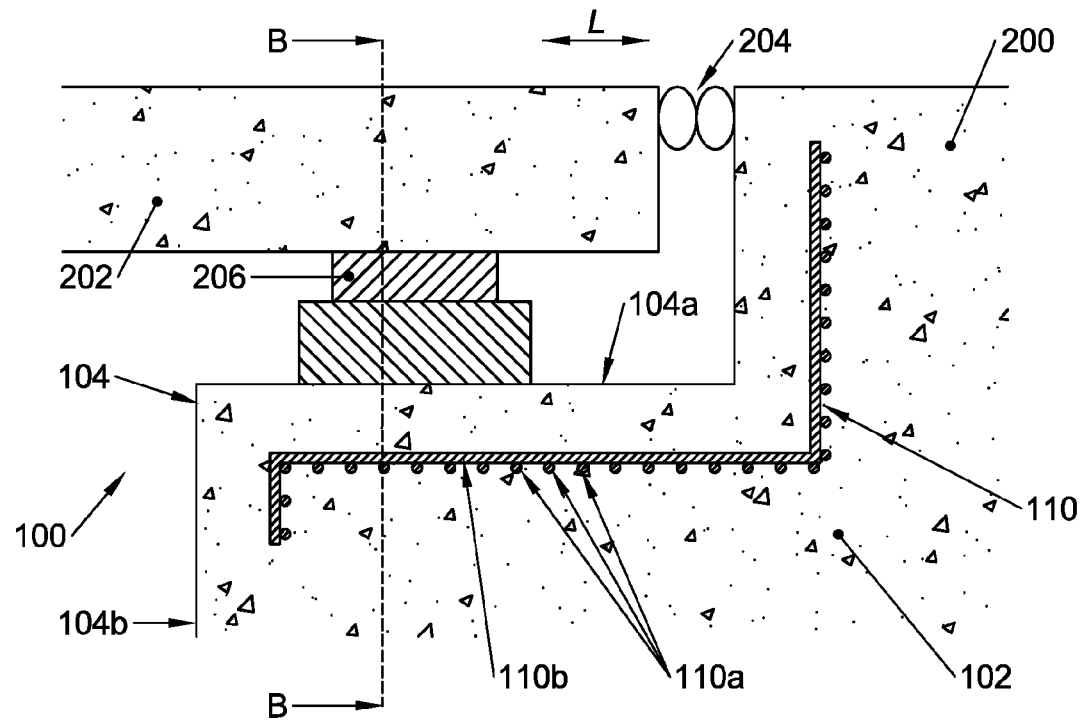
FIGS. 1A-B schematically illustrate in a longitudinal (FIG. 1A) and a transverse (FIG. 1B) cross-sectional view, respectively, a steel reinforced concrete structure comprising a bridge abutment supporting a bridge deck, wherein the steel reinforcement of the abutment is affected by chloride induced corrosion.
Figure 1B:
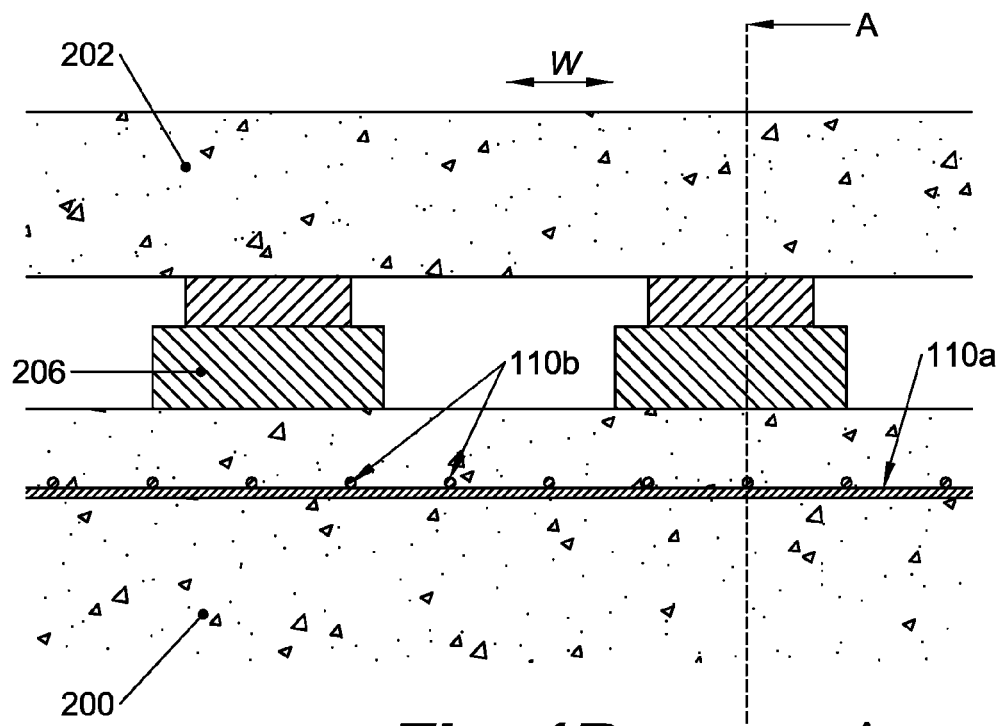
Figure 1C:
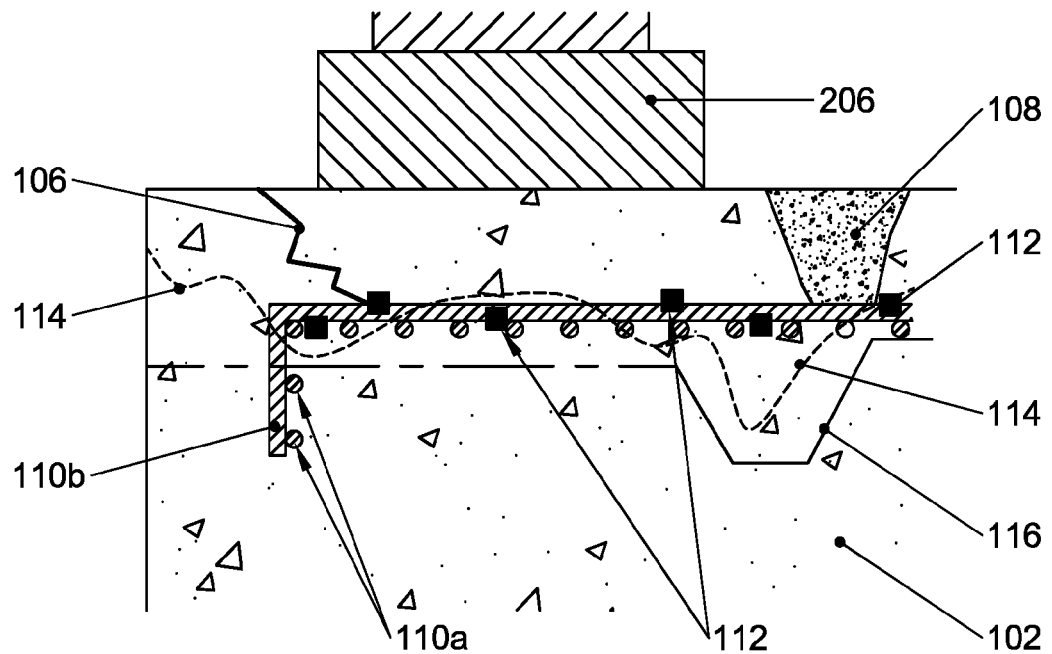
FIG. 1C schematically illustrates, in a detail taken from the longitudinal cross-sectional view of FIG. 1A, the level of chloride penetration and the occurrence of pitting (squares) and cracking and spalling of the concrete of the abutment.

As shown in FIGS. 1A-C, case I concerns a steel reinforced structure 100 in the form of a bridge, comprising a bridge abutment 200 of steel reinforced concrete, which supports a monolithic substantially concrete bridge deck 202. Leakage through an overlying expansion joint 204 has brought chloride containing water from de-icing salts (XD3 according to EN 206) onto the external concrete surface 104 of the abutment 200. Corrosion initiating chloride levels have penetrated into the concrete until slightly beyond the rebars 110 (the chloride front 114 is indicated in FIG. 1C), causing multiple corrosion pits 112 therein. About 1% of the total external surface 104 of the abutment 200 is affected by corrosion induced cracks 106 and spalls 108.

The owner has identified the corrosion problem based on a visual inspection that revealed several cracks 106 and spalls 108. Subsequently chloride sampling and potential mapping have been carried out, which has identified widespread chloride induced corrosion initiation across the top horizontal surface 104*a* of the abutment 200. Further development of damage is to be expected in a few years. The corrosion affected abutment section is about 1 meter deep by 15 meters wide (depth being measured into the abutment 200 from the external surface 104 inwards, and width being measured in the transverse direction).

1.2—Treatment Options

Available options for the repair and/or protection of the abutment 200 include: doing nothing, cathodic protection (CP), electrochemical chloride extraction (ECE), conventional repair, and treatment according to the present invention.

Doing nothing will cause considerable loss of concrete cross-section and rebar diameter within five to ten years time, with implications for structural safety and serviceability. This may typically be unacceptable to the owner.

With CP the cracked and spalled areas must be repaired. Following the initial repair a power source, having a cathode connected to the rebars and an anode connected to the repaired concrete surface, together with a monitoring system including sensors must be installed permanently. Due to limited working space, an anode based on a conductive coating is most appropriate, even though such an anode has a relatively short lifetime of typically about fifteen years. Operation of CP involves maintenance by electrical checks at least once every six months, and visual inspection once a year. The cost of operation and maintenance over twenty-five years may be as high as 50% of the initial cost of installing CP. Furthermore, the owner may prefer to continue his usual policy of visual inspection every five years than having to monitor annual testing reports.

Although electrochemical chloride extraction (ECE) is a temporary process, it requires several months of treatment to ensure that nearly all chloride is removed. Somewhat problematic is the determination of exactly when the treatment can be stopped. An accurate determination of this point in time requires periodic monitoring of chloride levels throughout the extraction process, while account must be taken of uncertainties due to erratic penetration of chloride. A further drawback for the owner may be that ECE is not available as a routine technique on some geographical markets. This may cause uncertainties about price levels and about the quality of the final result.

For a conventional repair of the abutment 200, significant amounts of concrete 102 should be removed. In principle, this concerns all chloride contaminated concrete 102, say up to at least 10 mm behind the rebars 110. Subsequently, the rebars 110 exposed by the concrete removal must be completely cleaned of corrosion products, and any chloride contained therein, for instance by grit blasting. For structural reasons, concrete removal and repair will have to be carried out in consecutive stages, wherein each stage concerns a certain section or area of the abutment 200; alternatively, additional support may be provided to the bridge deck 202. After the removal of the chloride contaminated concrete 102 and the cleaning of the rebars 110, new concrete must be placed. Overall, conventional repair may generally fit in the routine concrete maintenance policy of the owner. An important drawback, however, may be the narrow working space which will hinder proper execution (concrete removal, steel reinforcement cleaning). Accordingly, there may be a significant probability that the conventional repair will fail within five to ten years, and that corrosion will reactivate and rebar diameter loss will continue. This may compromise structural safety and serviceability. New repairs will then be necessary, potentially including the need to install a new steel reinforcement, which will considerably increase the magnitude and cost of the intervention and make is necessary to stop traffic using the bridge for some time.

The method according to the present invention improves upon the above-mentioned options by enabling the economic and durable (~15-25 years) repair of the abutment in a relatively short and predictable period of time. The successive steps involved in the application of the presently disclosed are described in the following section.

1.3—Treatment According to the Present Invention

The following steps may be taken to repair the corrosion affected section of the bridge abutment 200, or one or more parts thereof:

Determining an electric resistivity of the concrete 102 of the respective section of the abutment 200, so as to be able to temporarily repair any cracks 106, spalls 108 and the like with resistivity-matched repair mortar. The electric resistivity of the concrete 102 may, for instance, be measured using a four-point resistivity probe. Resistivity-matched repair mortar, in its cured state, may preferably have an electric resistivity between half and double that of the concrete 102 to be repaired so as to facilitate the following electrochemical treatment.

Cleaning an external concrete surface 104 of the respective section of the abutment 200, so as to render it free from oil, dust, etc.

Breaking out spalls 108, and applying, where necessary, temporary repairs 120 to damaged (e.g. cracked/spalled) portions of the concrete 102 of the respective section of the abutment 200 with resistivity-matched repair mortar, so as to provide a generally massive concrete body with a preferably smooth external surface 104. The repair mortar used for the temporary repairs may require a few days, typically about 7 days, to cure so that its electric resistivity will eventually match that of the concrete 102.

Verifying the electric continuity of the steel reinforcement 110. In case the reinforcement is non-continuous, an additional step may be included for making the steel reinforcement 110 continuous. Reinforcement continuity is present in most civil engineering structures built after 1945.

Figure 1D:
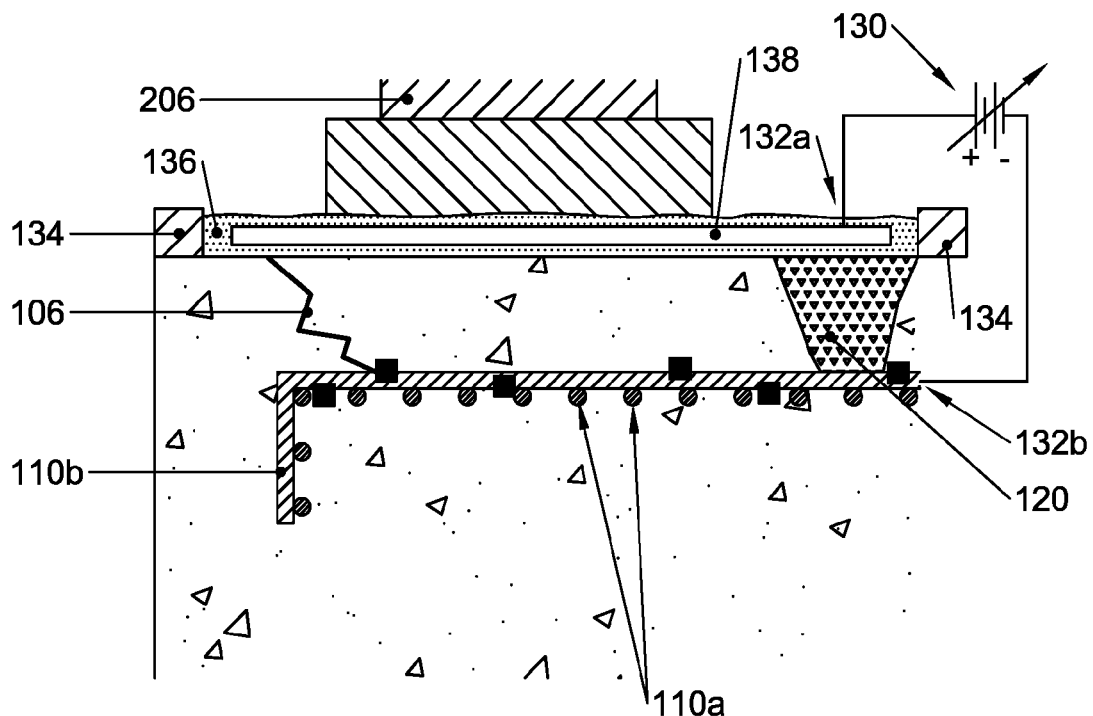
FIG. 1D schematically illustrates, in a detailed longitudinal cross-sectional side view, the abutment of FIGS. 1A-C during application of the electrochemical treatment.

Electrochemically treating the bridge abutment 200 in order to enrich the original concrete 102 and the resistivity-matched repair material 120 embedding the steel reinforcement 110 with chlorides originating from corrosion pits 112 in the steel reinforcement 110 and corrosion products on the steel reinforcement surface. The electrochemical treatment may include (see FIG. 1D):

Providing a DC power source 130.

Electrically connecting the steel reinforcement 110 in the respective section of the abutment 200 to be treated to the DC power source 130 as a (distributed) cathode/negative terminal 132*b*.

Figure 1E:
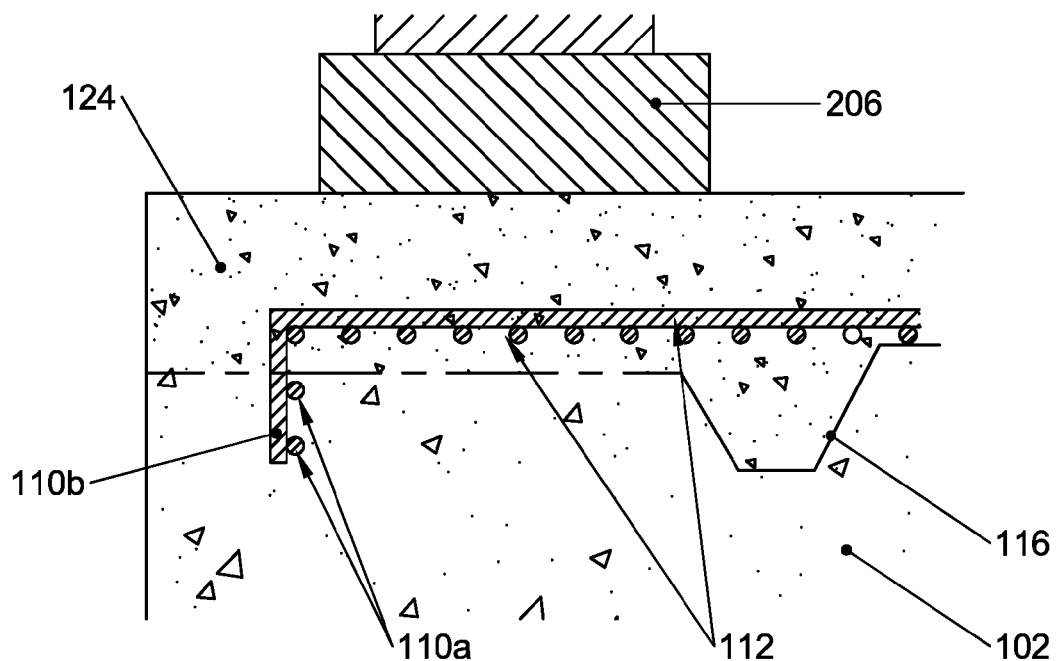
FIG. 1E schematically illustrates, in a detailed longitudinal cross-sectional side view, the abutment of FIGS. 1A-C once the material that embedded the steel reinforcement during the electrochemical treatment has been replaced with a permanent repair material.

Applying a distributed anode/positive terminal 132a to the cleaned external surface 104 of the respective section of the abutment 200 to be treated, and electrically connecting it to the DC power source 130.
  The anode 132a may, for instance, be applied to the abutment's surface 104 by forming ponds on a horizontally extending portion 104a thereof by placing ponding frames 134 or shutter walls thereon. The ponding frames 134 may be placed such that the surface 104a is effectively divided in discrete zones, each associated with a certain pond or compartment. The ponding frames 134 may be sealingly connected to the external surface 104a, such that the ponds are leakproof. The ponds may be filled with an electrically conductive fluid 136, e.g. an electrolyte solution of saturated $Ca(OH)_2$, and an anode mesh or plate 138, for instance made of activated or platinized titanium, may be placed in each of the ponds, preferably such that they are submerged in the electrically conductive fluid. The meshes 138 may be electrically connected to the DC power source 130.
Providing a DC distributed electric current between the anode and the cathode at a DC voltage in the range of 5-40 V, and a current intensity in the range of 1-10 $A/m^2$ of steel reinforcement surface.
  Setting the desired current intensity may require calculation of a surface area of the reinforcement (top/outer mesh) in the section to be treated; typically, the ratio is about 1 $m^2$ of steel reinforcement surface for 1 $m^2$ of external concrete surface 104. In the currently presented case, the current intensity might be set to about 5 $A/m^2$ of steel reinforcement surface, so that the total current is about 75 A for a total area of 15 $m^2$ of concrete surface 104a, which is divided between about 5 zones, each covering 3 $m^2$.
  Monitoring the intensity of the electric current, preferably independently for each zone, and, in case the actual current intensity diverts from the desired current intensity by more than a predetermined maximum deviation value, adjusting the voltage at which the DC power source 130 provides the electric current. The aforementioned predetermined maximum deviation value may, for instance, be 3 $A/m^2$ of steel reinforcement surface, such that the voltage at which the current is provided may be increased when the current intensity falls below 2 $A/m^2$, and be decreased when the current intensity exceeds 8 $A/m^2$ of steel reinforcement surface.
  Switching off the current when a total charge that is exchanged between the terminals 132a, 132b is in the range of 8-480 $Ah/m^2$ of steel reinforcement surface.
  Removing the DC source 130 and the distributed anode 132a (incl. the ponding frames 134, the electrically conductive fluid 136, the electrically conductive meshes or plates 138, and any cables).
Once the electrochemical treatment has been completed, replacing the concrete 102 embedding the steel reinforcement 110. The replacement may entail:
  Removing the concrete enriched in chlorides, typically up to slightly beyond the top/outer mesh of the steel reinforcement 110 that has been treated, such that the top mesh is exposed; see the break-out demarcation line 116 in FIG. 1C. For structural reasons it may be necessary to perform the removal stepwise, in smaller parts of say one-fifth of the width of the abutment 200. Alternatively, traffic across the bridge deck 202 may be stopped, or temporary support for the abutment 200 may be provided.
  Cleaning the concrete surface of the abutment 200 that is exposed due to the removal of the concrete previously embedding the steel reinforcement 110; and
  Applying a permanent repair material 124 that is relatively poor in, and preferably free of, chlorides, to replace any removed concrete 102, and curing the repair material. Once the permanent repair is completed, the abutment looks as displayed in FIG. 1E.

Case II—Cross Beam of Support Pillar of a Bridge

The second case features a steel reinforced concrete structure whose rebars display wide spread corrosion and pitting at an advanced stage. As a consequence of the corrosion, the embedding concrete suffers from heavy spalling.

2.1—Background

Figure 2A:
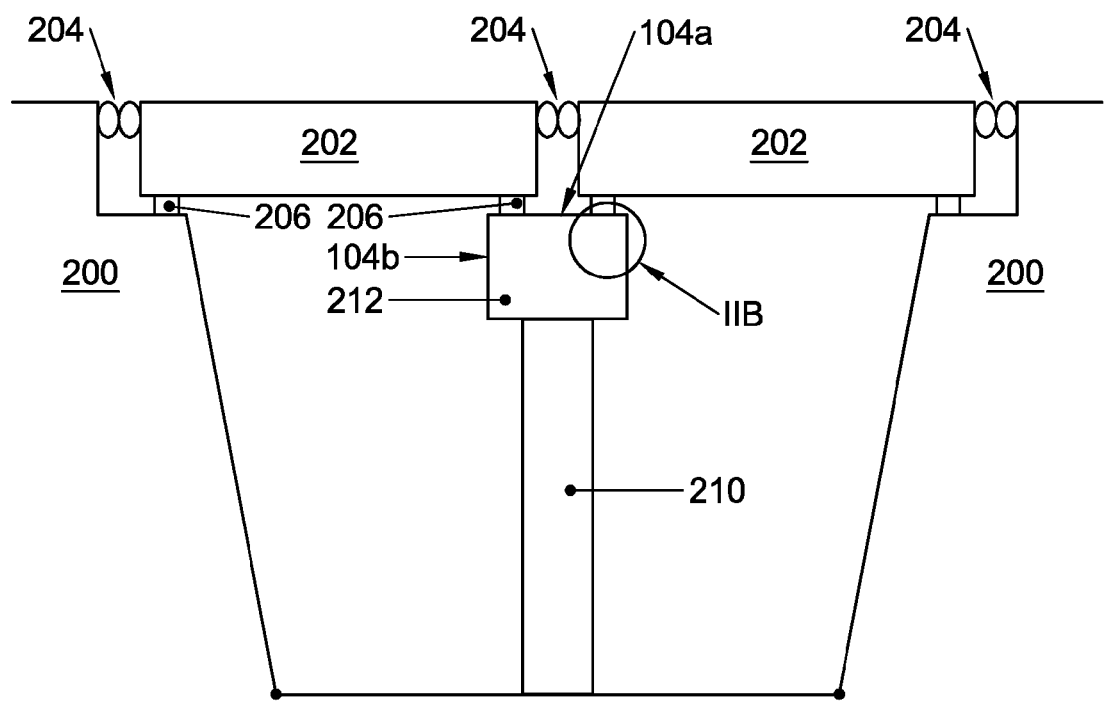
FIG. 2A schematically illustrates, in a longitudinal side view, an overpass construction including a support pillar supporting a corrosion affected steel reinforced cross beam, which in turn supports a two-part road deck.
Figure 2B:
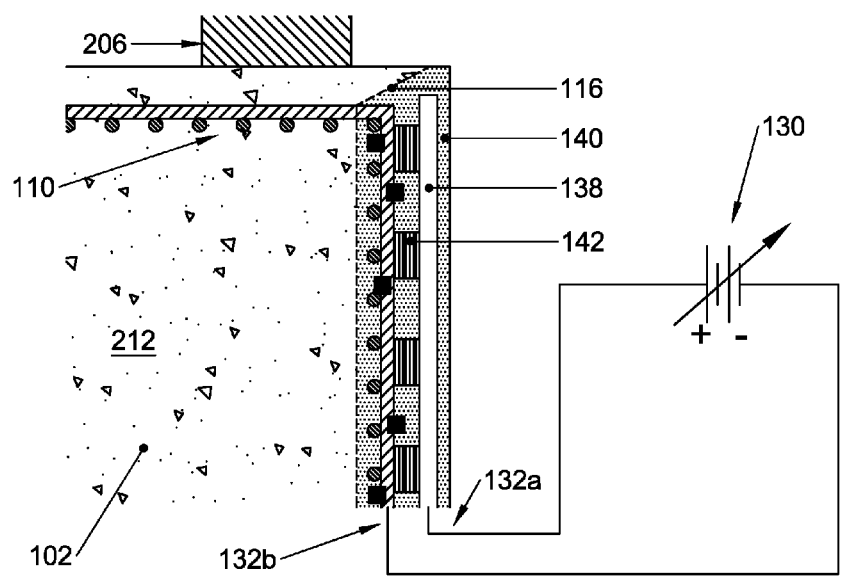
FIG. 2B schematically illustrates, in a detailed cross-sectional side view, the cross-beam shown in FIG. 2A during application of the electrochemical treatment.

As shown in FIGS. 2A-B, case II concerns a steel reinforced structure 100 in the form of an overpass, comprising two abutments 200, a support pillar 210 with a steel reinforced concrete cross beam 212 on top, and a two-part road deck 202, each part being supported by the cross beam 212 and a respective abutment 200. Leakage through an overlying expansion joint 204 has brought chloride containing water from de-icing salts (XD3 according to EN 206) onto the external concrete surface 104 of the cross beam 212. Corrosion initiating chloride levels have penetrated well behind the rebars 110, causing multiple corrosion pits 112 and heavy spalling 108 of the concrete 102. The spalling has affected more than half of the vertical surface 104b of the cross beam 212.

The owner has identified the corrosion problem based on a technical inspection that revealed the large spalls. Spalls have then been removed from the cross beam to avoid pieces falling off onto the traffic lanes below. Further development of corrosion and damage is to be expected in a few years, seriously compromising the load bearing capacity of the cross beam. The corrosion affected cross beam section is about 1 meter deep by 15 meters wide.

2.2—Treatment Options

Available options for repair and/or protection of the cross beam are essentially the same as those in case I, and so are the arguments for and against the various options. Due to the heavy spalling, however, repairing the surface of the cross beam 212, for instance to enable a CP or ECE treatment, may be more laborious and involve applying a new layer of concrete (shotcrete). The new concrete layer may have a thickness in the range of about 20-30 mm, and add to the total weight of the cross beam to such an extent that structural recalculations are called for.

The method according to the present invention again improves upon the available options by enabling the economic and durable (~15-25 years) repair of the abutment in a relatively short and predictable period of time. The successive steps involved in the application of the presently disclosed method are described in the following section.

2.3—Treatment According to the Present Invention

The following steps may be taken to repair the corrosion affected cross beam 212 of the overpass, or a part thereof:
  Removing the cracked and spalled concrete 102 at the outside of the cross beam 212 up to somewhat behind the steel reinforcement 110 so as to expose the latter. For structural reasons, it may be necessary to do so in smaller parts of say one-fifth of the length of the cross beam 212 (measured in the transverse direction) and/or to stop traffic from using the overpass and/or to provide temporary support to the cross beam 212.

Verifying the electric continuity of the steel reinforcement 110. In case the reinforcement is non-continuous, an additional step may be included for making the steel reinforcement 110 continuous.

Electrochemically treating the cross beam 212 in order to deplete the steel reinforcement 110 in chlorides. The electrochemical treatment may include:

Providing a DC power source 130.

Electrically connecting the steel reinforcement 110 in the respective section of the cross beam 212 to be treated to the DC power source 130 as a (distributed) cathode/negative terminal 132b.

Embedding the exposed steel reinforcement 110 in an electrically conductive medium 140, for instance a wet electrolyte paste or a wet sponge soaked with electrolyte.

Applying a distributed anode/positive terminal 132a to the electrically conductive medium 140, for instance by applying an anode mesh or plate 138 to an external surface thereof or by embedding the anode mesh or plate 138 therein, and electrically connecting the anode mesh or plate to the DC power source 130. The anode mesh or plate 138 may preferably be spaced apart from the steel reinforcement 110 by electrically insulating spacers 142 to warrant a uniform distribution of current.

Providing a DC distributed electric current between the anode and the cathode at a DC voltage in the range of 5-40 V, and a current intensity in the range of 1-10 $A/m^2$ of steel reinforcement surface.

Monitoring the intensity of the electric current, and, in case the actual current intensity diverts from the desired current intensity by more than a predetermined maximum deviation value, adjusting a voltage at which the DC power source 130 provides the electric current.

Switching off the current when a total charge that is exchanged between the terminals 132a, 132b is in the range of 8-480 $Ah/m^2$ of steel reinforcement surface.

Once the electrochemical treatment has been completed:

Removing the DC power source 130, the distributed anode 132a and the electrically conductive medium 140 (incl. the insulative spacers 142, the electrically conductive meshes or plates 138, and any cables).

Cleaning the concrete surface of the cross beam 212 that was exposed to the electrically conductive medium 140 previously embedding the steel reinforcement 110.

Applying a repair material that is relatively poor in, and preferably free of, chlorides, to replace any removed concrete, and curing the repair material.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 100 steel reinforced concrete structure
102 concrete
104 external surface of structure
104a,b horizontal top (a) and vertical side (b) surface of structure
106 crack
108 spall
110 steel reinforcement/rebars
110a,b main bar (a) and stirrup (b)
112 corrosion pit
114 chloride front
116 break-out limit
120 electric resistivity-matched (temporary) repair mortar
124 (permanent) repair material
130 DC power source
132a,b anode (a) and cathode (b)
134 ponding frame
136 electrically conductive fluid/electrolyte solution
138 anode mesh or plate
140 electrically conductive medium, e.g. electrolyte paste
142 electrically insulative spacer
200 abutment
202 bridge or road deck
204 expansion joint
206 prop
210 support pillar
212 cross beam
L longitudinal direction
W transverse/width direction

The invention claimed is:

1. A method of repairing a steel reinforced concrete structure affected by chloride induced corrosion, comprising:
    subjecting the reinforced concrete structure to an electrochemical treatment so as to enrich original material embedding a steel reinforcement with chlorides originating from corrosion pits in the steel reinforcement; and
    replacing the original material embedding the steel reinforcement, which original material has been enriched with chlorides during the electrochemical treatment, with a repair material that is relatively poor in chlorides.

2. The method according to claim 1, wherein the original material embedding the steel reinforcement is substantially concrete.

3. The method according to claim 2, further comprising:
    before subjecting the reinforced concrete structure to the electrochemical treatment, repairing a defect in the concrete embedding the steel reinforcement with temporary electric resistivity-matched repair mortar to ensure electrical homogeneity.

4. The method according to claim 3, wherein replacing the concrete embedding the steel reinforcement after the electrochemical treatment comprises:
    removing the concrete embedding the steel reinforcement that has been enriched with chlorides;

cleaning a surface of the steel reinforced concrete structure that was exposed due to the removal of the enriched embedding the steel reinforcement; and applying and curing the repair material.

5. The method according to claim 2, further comprising:
before subjecting the reinforced concrete structure to the electrochemical treatment, replacing concrete embedding the steel reinforcement with an electrolyte that will serve as the material embedding the steel reinforcement during the electrochemical treatment.

6. The method according to claim 5, wherein replacing the electrolyte embedding the steel reinforcement after the electrochemical treatment comprises:
removing the electrolyte embedding the steel reinforcement that has been enriched with chlorides by the electrochemical treatment;
cleaning a surface of the steel reinforced concrete structure that was exposed due to the removal of the enriched electrolyte embedding the steel reinforcement; and
applying and curing the repair material.

7. The method according to claim 5, wherein the electrochemical treatment comprises:
applying a distributed electrode to the electrolyte embedding the steel reinforcement, and
applying a DC voltage across the distributed electrode, as a positive terminal, and the steel reinforcement, as a negative terminal, thereby effecting a distributed current between the distributed electrode and the steel reinforcement.

8. The method according to claim 1, wherein the repair material is concrete.

9. The method according to claim 2, wherein the electrochemical treatment comprises:
applying a distributed electrode to the concrete embedding the steel reinforcement, and
applying a DC voltage across the distributed electrode, as a positive terminal, and the steel reinforcement, as a negative terminal, thereby effecting a distributed current between the distributed electrode and the steel reinforcement.

10. The method according to claim 9, wherein the DC voltage is in the range of 5-40 V.

11. The method according to claim 9, wherein a current intensity of the distributed current is in the range of 1-10 $A/m^2$ of steel reinforcement surface.

12. The method according to claim 9, wherein the distributed current is flowing during a period in the range of 8-48 hours.

13. The method according to claim 9, wherein a total charge that is exchanged between the terminals during the electrochemical treatment is in the range of 8-480 $Ah/m^2$ of steel reinforcement surface.

14. The method according to claim 13, wherein a total charge that is exchanged between the terminals during the electrochemical treatment is in the range of 24-240 $Ah/m^2$ of steel reinforcement surface.

* * * * *

UNITED STATES PATENT AND TRADEMARK OFFICE
CERTIFICATE OF CORRECTION

PATENT NO. : 9,969,656 B2
APPLICATION NO. : 14/906609
DATED : May 15, 2018
INVENTOR(S) : Polder et al.

Page 1 of 1

It is certified that error appears in the above-identified patent and that said Letters Patent is hereby corrected as shown below:

On the Title Page

Item (73), ASSIGNEE:
Now reads: "NEDERLANDSE ORGANISATIE VOOR
TOEGEPAST-NATUURWETENSCHAPPELIJK ONDERZOEK TNO, The Hague (NL)";
Should read: -- NEDERLANDSE ORGANISATIE VOOR
TOEGEPAST-NATUURWETENSCHAPPELIJK ONDERZOEK TNO, The Hague (NL) and
NORWEGIAN UNIVERSITY OF SCIENCE AND TECHNOLOGY, Trondheim (NO) --

Signed and Sealed this
Fifth Day of February, 2019

Andrei Iancu
*Director of the United States Patent and Trademark Office*